INVENTOR.
FRED HUNZIKER

Feb. 23, 1943.   F. HUNZIKER   2,311,662
FORMING METHOD
Original Filed Feb. 23, 1937   5 Sheets-Sheet 3
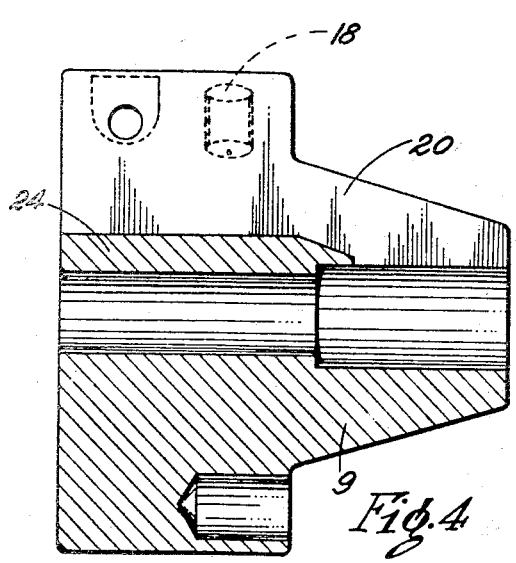
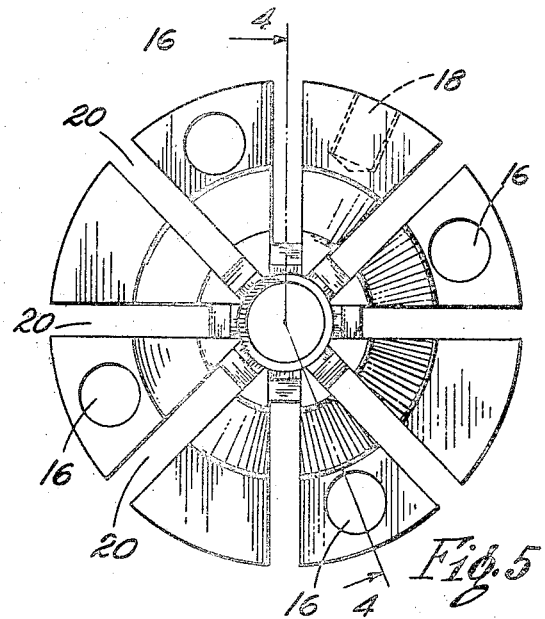
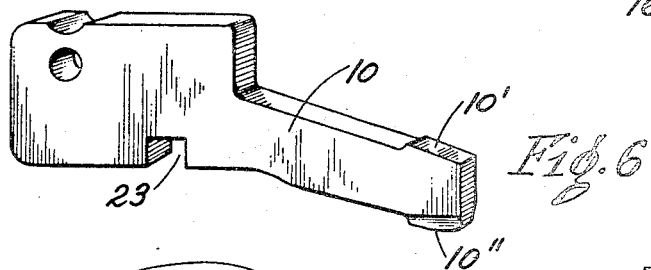
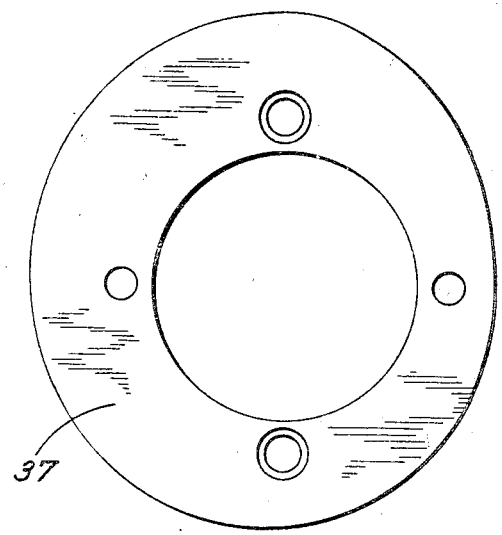
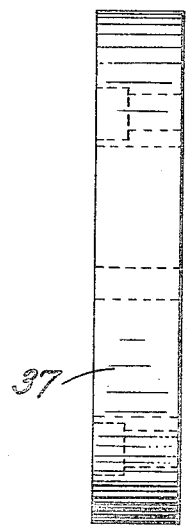
INVENTOR.
FRED HUNZIKER
BY Richey & Watts
ATTORNEYS.

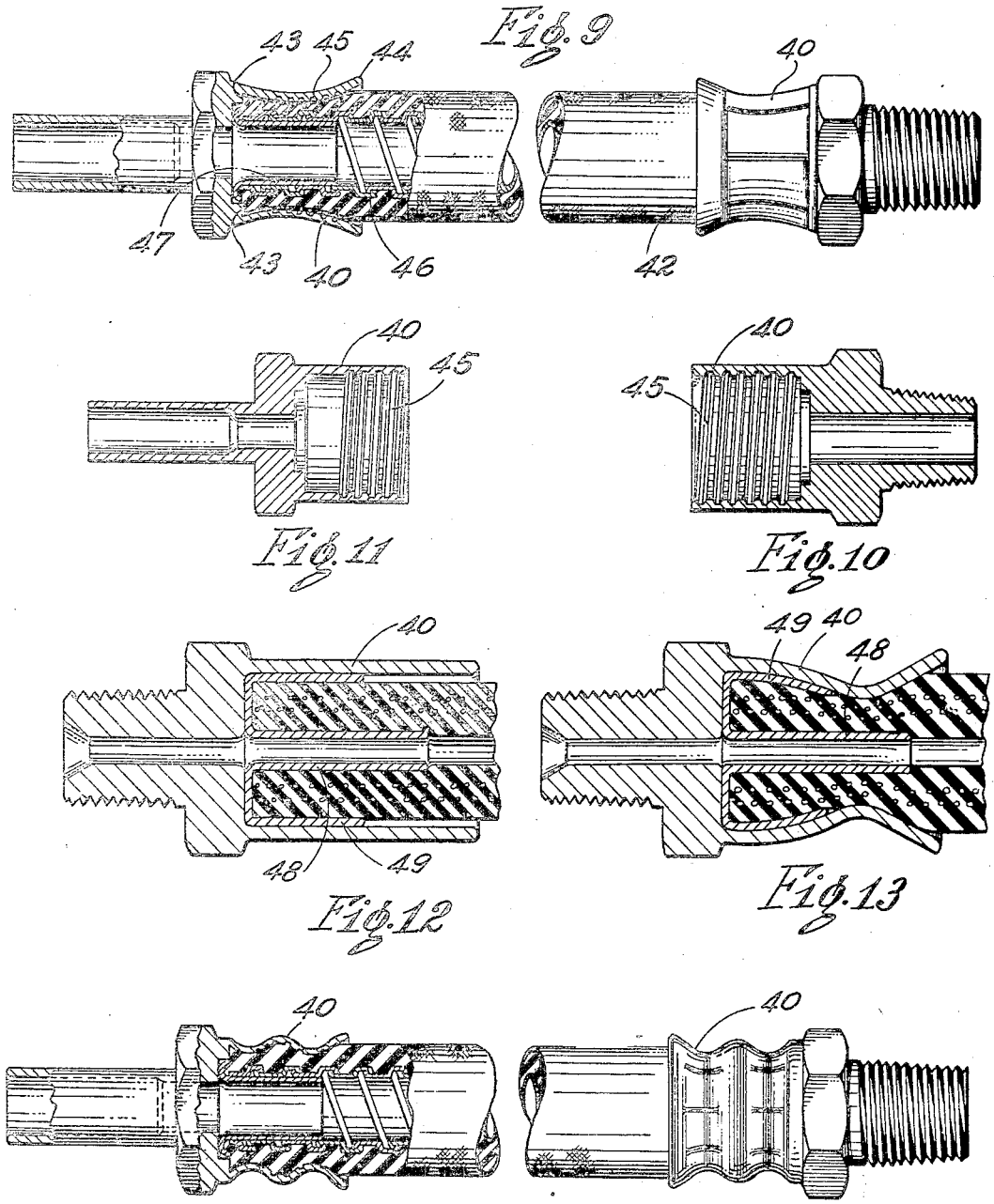

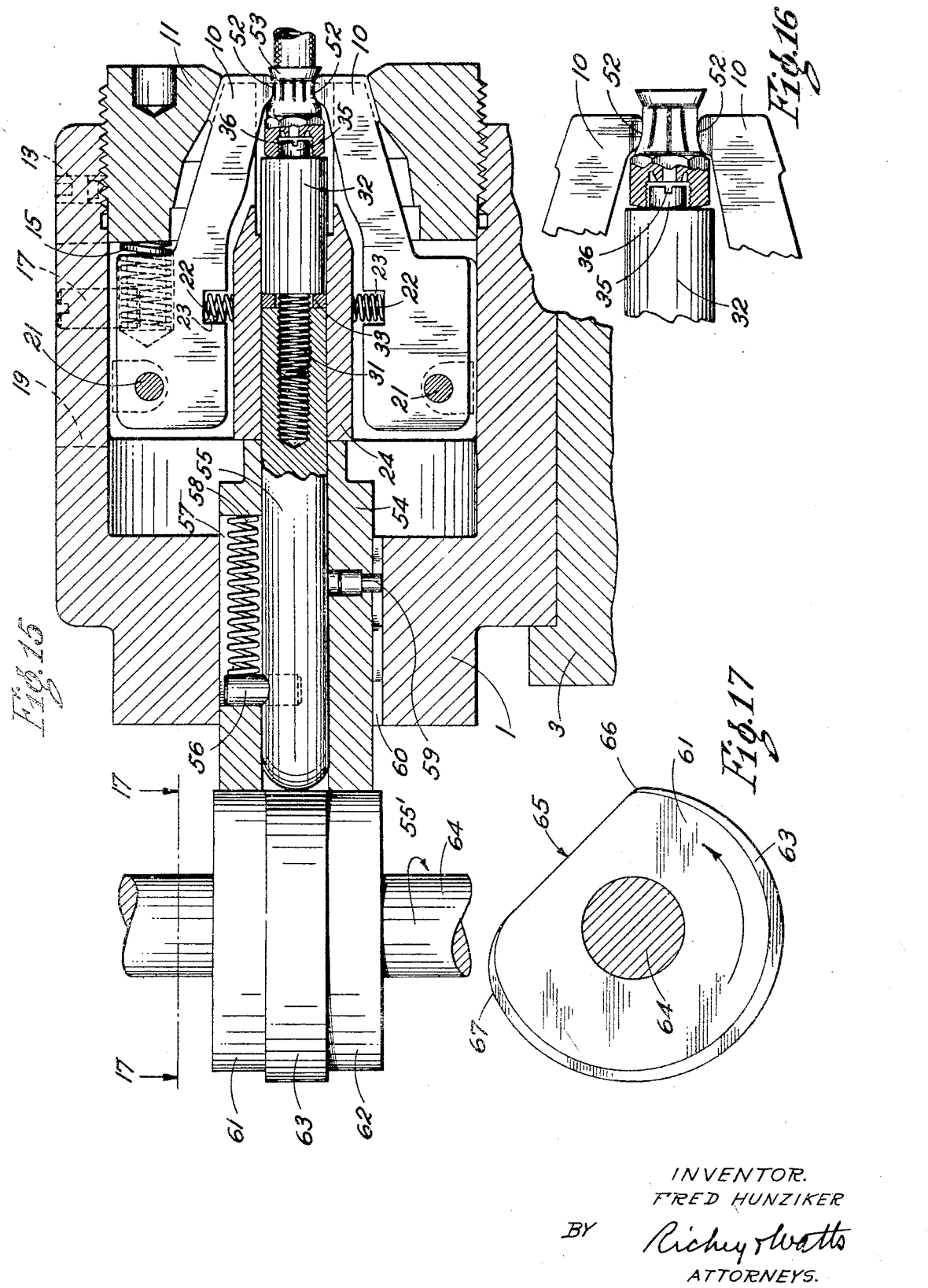

Patented Feb. 23, 1943

2,311,662

UNITED STATES PATENT OFFICE 2,311,662

FORMING METHOD

Fred Hunziker, Cleveland, Ohio, assignor to The Weatherhead Company, Cleveland, Ohio, a corporation of Ohio Original application February 23, 1937, Serial No. 127,117. Divided and this application November 14, 1939, Serial No. 304,359

1 Claim. (Cl. 29—88.2)

This invention relates to an improved method of securing fittings, such as couplings and the like, to hose ends and particularly to flexible hose of fabric and rubber or other suitable resilient flexible material.

This application is a division of my co-pending United States patent application Serial No. 127,117, filed February 23, 1937 issued Aug. 13, 1940 as patent No. 2,211,622.

In attaching metal fittings to the ends of flexible hose such as is used for hydraulic brake fluid pressure conducting conduits and gasoline feed lines in automotive vehicles, it is of great importance to secure the fittings in an entirely leakproof manner and so that the joint between the fitting and the hose will be at least as strong as the hose itself. Prior to the present invention fittings of the general type herein illustrated and described have been secured to the ends of flexible hose by slipping the end of the hose into a tubular sleeve portion of the coupling and then rolling down the tubular portion of the coupling so that it tightly grips the hose, compressing the resilient material of the hose and forcing the hose end into sealing engagement with a suitable shoulder at the inner end of the sleeve of the coupling.

Patent No. 2,000,680 to Albert J. Weatherhead, Jr., described and claims a method of securing hose couplings to the end of a hose by a rolling and spinning operation. Although this method is effective in providing a rigid attachment of the coupling to the hose it possesses certain disadvantages. The rolls and spinners used in the Weatherhead method have a kneading action on the coupling shell involving considerable friction and cold working of the metal. In order to obtain a proper connection the rolls must make a number of revolutions relative to the hose and coupling and thus any point on the coupling which is acted on by the rolls is subjected to a large number of separate rolling and spinning actions. This makes it extremely difficult to roll or spin plated hose ends without cracking or otherwise injuring the plating. Furthermore, the metal of the coupling itself must be very carefully selected and of relatively expensive type in order to stand up under the drastic kneading and cold working of the Weatherhead process. In the case of relatively hard brass, in order to withstand the kneading action of the rolls or spinners, it is usually necessary in the Weatherhead method to anneal the couplings before they are attached to the hose. This annealing destroys some of the desirable properties of the metal of the fitting. Further, after the parts are annealed they must be subjected to an acid cleaning in order to restore their bright appearance and with threaded fittings the acid attacks and weakens the threads. Another disadvantage of the rolling and spinning method is that the rolls, regardless of the metal used and because of the localized pressure exerted, reduce the thickness of the wall sections of the coupling considerably thereby proportionately reducing the strength of the assembly.

It is among the objects of the present invention to provide a method of securing fittings to hose ends in which the necessity for annealing and pickling before attaching them to the hose is eliminated and in which the original physical properties of the metal of the fittings are retained during and after the attachment of the coupling to the hose.

Further objects of the invention are: the provision of an improved method of securing fittings to hose ends which will result in a pressure tight joint between the fittings and hose and which will provide a flared end on the fitting adjacent the hose whereby cutting of the hose by the edge of the fitting is avoided; the provision of a method of securing a fitting to a hose end which will permit the use of a wide variety of inexpensive and easily machined metals in their natural state without requiring annealing or other special heat treatment; and the provision of a method of securing a fitting to a hose end which may be performed at a relatively high rate of speed by unskilled persons without danger and which may be used with couplings of round, hex, square or other cross-sectional shapes.

The above and other objects of my invention will appear from the following description of my improved method and a machine which is adapted efficiently and economically to carry out the method, reference being had to the accompanying drawings, in which—

Figure 4 is a cross-section taken on line 4—4 of Figure 5 and illustrating the crimping, pressing or forming finger supporting spider or frame.

Figure 5 is an end view of the finger supporting frame shown in Figure 4.

Figure 6 is a detached perspective view of one of the crimping fingers.

Figures 7 and 8 are side and face views respectively of one form of cam which may be used to actuate the device of Figures 1 to 6.

Figure 9 is a view of a gasoline hose having a metal lining and equipped with couplings secured in accordance with my method.

Figure 10 is a detached cross-sectional view of one of the couplings of Figure 9 before the crimping operation has taken place.

Figure 11 is a view similar to Figure 10 but illustrating the fitting shown on the left hand end of the hose in Figure 9.

Figure 12 is a fragmentary cross-sectional view of a high-pressure hose and coupling before the crimping operation has taken place.

Figure 13 is a view of the hose end shown in Figure 12 after the tubular sleeve portion of the coupling has been deformed to secure it to the hose.

Figure 14 is a view generally similar to Figure 9 but illustrating a modified form of crimp in which a double bend is imparted to the tubular flange of the coupling.

Figure 1:
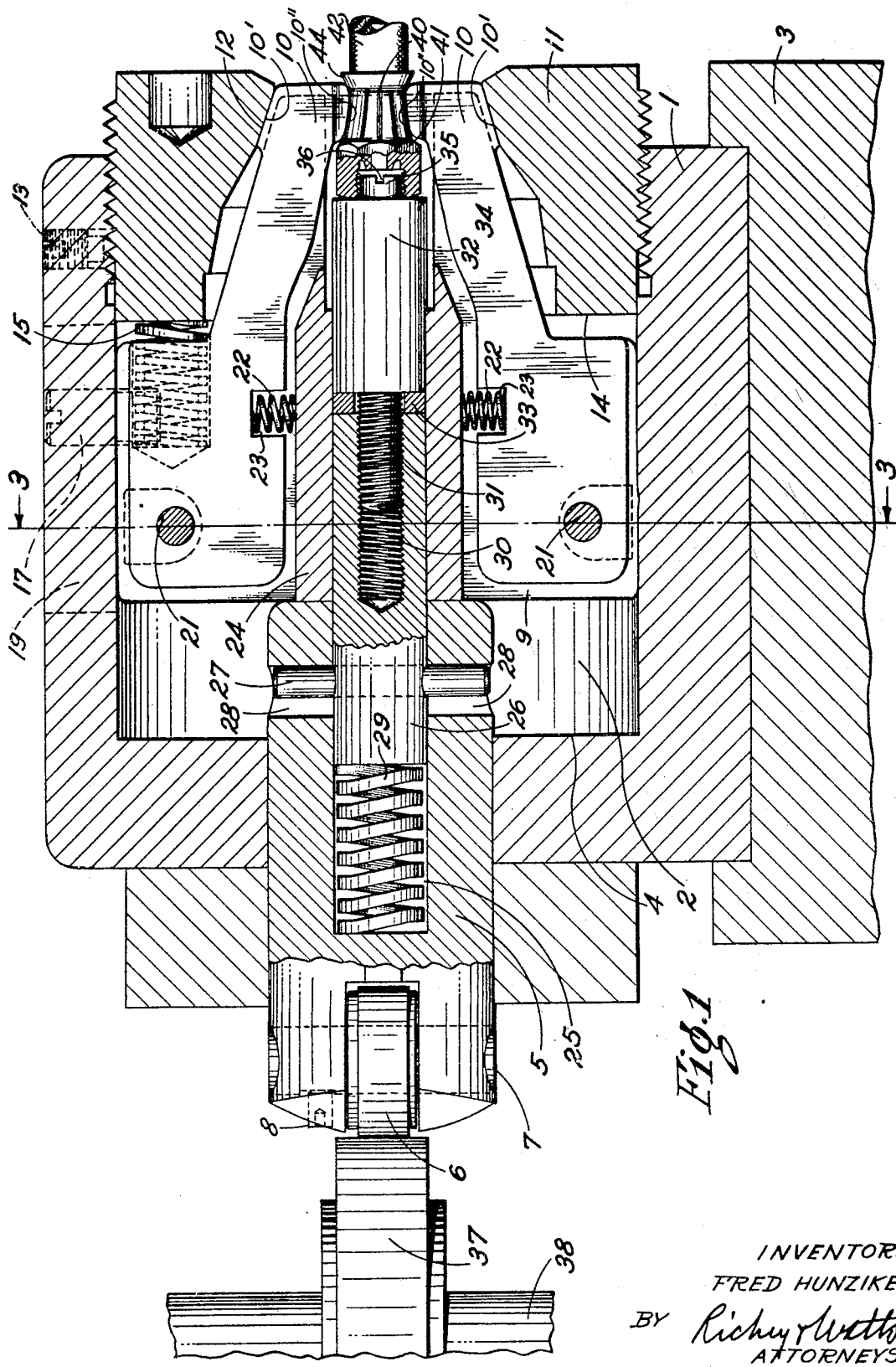
Figure 1 is a vertical section through one embodiment of my forming machine showing a fitting and hose end in position, the parts being shown in the positions they assume when the coupling or fitting has been fully crimped.

Figure 15 is a cross-sectional view generally similar to Figure 1 but illustrating a modified form of forming machine for combined pressing and swaging of an article.

Figure 16 is a fragmentary view of the pressing fingers and coupling illustrated in Figure 15 but showing the arrangement of the parts after the longitudinal movement of the coupling has been completed.

Figure 17 is a view taken on line 17—17 of Figure 15 illustrating the double cam for operating the machine of Figure 15.

Figure 2:
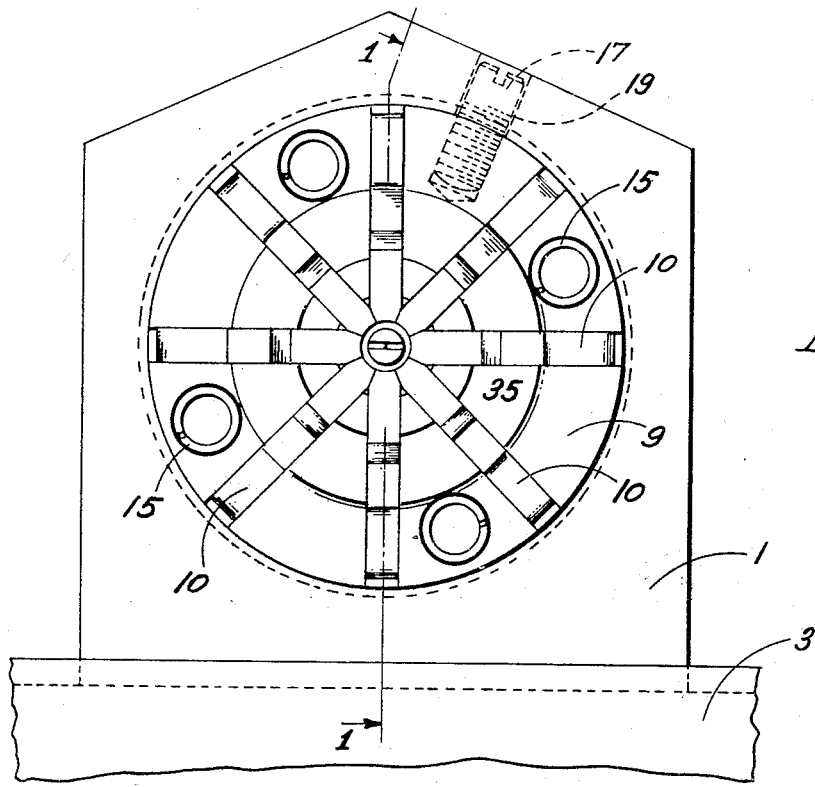
Figure 2 is a view of the hose receiving end of the device shown in Figure 1 but on a somewhat smaller scale and shown with the hose end and coupling removed.
Figure 3:
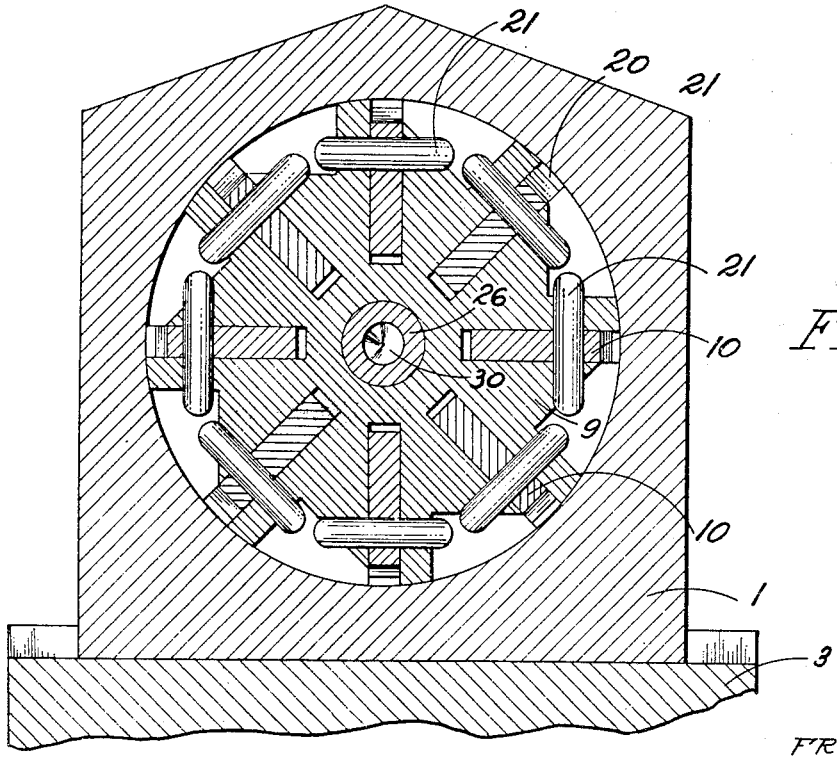
Figure 3 is a cross-sectional view taken substantially on line 3—3 of Figure 1 but on a somewhat reduced scale.

Referring now to Figure 1, the shell or housing 1 is provided with a cylindrical bore 2. The housing 1 may be fixed to and supported in any suitable manner on the base 3. The end 4 of the housing 1 is bored to accommodate the plunger 5 which carries the cam follower 6 at one end. This roll 6 may be mounted to rotate on a shaft 7 which is secured in position by a set screw 8. The plunger 5 extends into the bore 2 of the housing 1 and abuts against the spider or frame 9 which carries the crimping, pressing or forming fingers 10. As is seen in Figures 2 and 3 the spider or frame 9 has a sliding fit in the cylindrical bore 2 of the housing 1. A threaded collet 11 is disposed at the opposite end of the cylindrical bore 2 and is provided with a tapered conical crimping finger engaging surface 12. This collet 11 may be screwed into the housing 1 a degree sufficient to give the desired deformation, as will be later explained, and a set screw 13 extends through the housing 1 and locks the collet 11 in the desired position. The inner face 14 of the collet 11 forms an abutment for the springs 15 (see Figs. 1 and 2) which are disposed in spaced holes 16 in the sliding frame or spider 9. These springs are under compression and exert a force tending to move the spider 9 toward the end wall 4 of the housing 1. A pin 17 is secured in a suitable aperture 18 (see Figs. 4 and 5) in the spider 9 and extends up into a slot 19 in the housing 1. This slot permits longitudinal movement of the pin 17 and the spider 9 and prevents rotation of the spider 9 in the housing 1.

As is best seen in Figures 4 and 5, the spider 9 is preferably provided with eight slots 20, equally spaced circumferentially of the spider and of suitable width to guide the eight crimping fingers 10. Each finger 10 is pivotally supported in the spider 9 by means of a pin 21. These pins 21, as seen in Figure 3, extend through suitable apertures in the spider 9 and provide centers about which each of the fingers 10 may swing. Springs 22 (see Fig. 1) extend into the cut-out portions 23 of the fingers 10 and have their inner ends bearing against the central tubular hub portion 24 of the spider 9. These springs 22 tend to move the pressing or crimping ends of the fingers 10 radially outwardly about their pivot pins 21.

The plunger 5 is provided with a central bore 25 and a bar 26 has a sliding fit therein. The movement of the bar 26 is limited in an axial direction by means of a pin 27 which extends through the bar 26 and is disposed in a slotted aperture 28 in the plunger 5. This pin and slot arrangement also prevents rotation of the bar 26 relative to the plunger 5. A compression spring 29 is disposed between the bottom of the bore 25 and the end of the bar 26 and tends to hold the bar in the position shown in Figure 1 with the pin 27 against the right hand end of the slotted aperture 28. The right hand end of the bar 26 has a threaded aperture 30 to accommodate the threaded portion 31 of the adjustable stop member 32. A spacing washer 33 is disposed between the stop member 32 and the end of the bar 26 and by varying the thickness of the spacing washer 33 the position of the end 34 of the stop member 32 may be adjusted. In the apparatus illustrated the end of the stop member 32 is provided with a boss 35 which centers the fitting relative to the crimping fingers. If desired this boss 35 may be provided with a screw driver slot 36 to facilitate adjustment of the installation thereof, and it will be understood that the end of the stop 32 may be formed to accommodate different types of fittings.

To operate the forming device just described I provide a cam 37 mounted on a shaft 38 which may be driven from any suitable source of power (not shown). In the preferred operation of my apparatus this cam will be either intermittently rotated through a clutch (not shown) controlled by the operator or continuously rotated causing the forming device to operate in a continuous repeating cycle. The cam may have any shape to give the type of action desired. It will be understood that, if desired, my forming device can be readily adapted in a portable form to manual operation by means of a suitable hand crank, lever or the like.

In operation of the forming mechanism the plunger 5 is reciprocated by means of the cam 37. When the plunger is moved to the right (Fig. 1) by the cam 37 it pushes the spider 9 to the right and compresses the four circumferentially spaced springs 15. As the cam 37 rotates the springs 15 will move the spider 9 and the plunger 5 to the left. This reciprocating motion of the plunger 5 and the spider 9 will cause the fingers 10, and particularly the tapered faces 10' thereof, to slide on the tapered surface 12 of the collet member 11. In the position of the parts illustrated in Figure 1 the plunger 5, the spider 9, and the fingers 10 are in their farthest right or crimping positions and the crimping faces 10" of the fingers 10 have engaged and deformed the tubular sleeve portion 40 of the coupling. As the operating cycle proceeds and the cam 37 continues to rotate, the spider 9 and the fingers 10 move to the left from the position shown in Figure 1, due to the action of the springs 15, and the springs 22 cause the fingers 10 to spread apart, the faces 10' of the fingers stay in contact with the surface 12 of the collet 11 and the pressing or crimping faces 10" open. When the spider 9 reaches the end of its return or releasing stroke the fingers 10 will be spread apart sufficiently to permit the free withdrawal of the coupling 41 from within the separated crimping faces 10" and the insertion of another coupling therein. As the cycle continues the new coupling will be subjected to the forming action of the fingers 10 caused by their sliding on the inclined or tapered surface 12 of the collet 11. By adjusting the position of the stop 32 and its end face 34 the position, in an axial direction, of the coupling relative to the crimping faces 10" of the fingers 10 may be accurately adjusted.

During the forming action of the fingers 10 the metal of the cylindrical flange 40 of the coupling is bent inwardly and may tend to flow a small amount in an axial direction. Any flow of metal to the right (Fig. 1) is freely permitted and the threaded end of the coupling 41 may also move to the left to accommodate any elongation or flow of metal. This movement is permitted due to the resilient arrangement of the support for the stop member 32 and when such movement takes place the stop 32 and the bar member 26 will move to the left compressing the spring 29 and moving the pin 27 in the slot 28. In some instances it may not be necessary nor desirable to permit axial movement of the threaded portion of the coupling and in such instances the stop member 32 may be rigidly secured to the hub or tubular portion 24 of the spider 9 or, as an alternative, a wedge or block (not illustrated) may be inserted in the slot 28 and the end of the slot to between the pin 27 and the end of the slot to prevent movement of the pin 27 in the slot, thus locking the bar 26 and the stop 32 from axial movement relative to the spider 9.

By screwing the collet 11 in or out the position of the tapered surface 12 relative to the fingers 10 is varied and such adjustment will vary the degree of radial movement of the fingers 10 for a given axial or longitudinal movement thereof. It will be understood that my apparatus can be readily changed to accommodate different sizes of couplings or fittings by such adjustment or by merely inserting a new set of fingers having properly shaped crimping faces and being of proper dimensions to engage the particular fitting being handled. The crimping movement of the fingers 10 is substantially radially inwardly of the tubular flange 40 of the fitting. When the fingers reach their innermost position (see Fig. 2) each finger is substantially in contact with its adjacent finger and substantially the entire circumference of the sleeve of the coupling is engaged thereby. A steady uniform pressure is applied throughout the engaged surface of the coupling and, due to the contour of the crimping faces of the fingers 10, the substantially radially inward movement thereof tends to cause the end of the hose 42 to be forced with great pressure against its seat 43 in the coupling (see Fig. 9).

The inward bending of the sleeve 40 by the fingers 10 also causes the lip or end 44 of the sleeve 40 to flare outwardly, as is clearly shown in Figures 1 and 9, so that the diameter of the lip 44, after the forming operation, is larger than it was prior thereto. As is best seen in Figure 9 this flaring of the edge of the lip or sleeve 40 relieves the pressure of the sleeve against the hose 42 and provides a connection which will permit flexing or bending of the hose without wearing or cutting thereof.

In Figure 9 I have illustrated a hose provided with two different types of couplings, neither of which is the same as that illustrated in Figure 1. However, the difference between the various couplings illustrated lies primarily in the attachment end. They are all provided with a cylindrical sleeve portion 40 which fits over the end of the hose and which is crimped inwardly by the crimping fingers 10 to cause secure grip on the hose and also to force the inner end of the hose into fluid tight contact with the shoulder in the coupling.

As is seen in Figures 10 and 11, which illustrate the couplings of Figure 9 prior to their being attached to the hose, the sleeve ends 40 are preferably provided with coarse internal threads 45, preferably with rounded or flat root sections, which grip the hose surface. The particular hose illustrated in Figure 9 is of the metal lined type provided with a flexible metal lining 46. With this type of hose a sleeve member 47 is preferably inserted in the end thereof to form a better joint between the end of the hose and the coupling, to prevent leakage therebetween and to support the metal lining against collapse.

In Figures 12 and 13 the type of coupling which is used for high pressure hydraulic brake hose is illustrated. This type of hose is not lined and in order to prevent collapse of the opening through the hose during the crimping operation a tubular member 48 is employed which extends into the hose and is provided with a cup-shaped portion 49 which fits within the sleeve 40. As is seen in Figure 13, the same flaring of the open end of the sleeve 40 occurs with this embodiment of my improved coupling as that previously described and thus cutting of the hose adjacent the coupling is prevented.

In Figure 14 a modified form of coupling attachment is illustrated in which the crimping dies are so formed as to bend the metal of the sleeve 40 inwardly at a plurality of places. This embodiment may be advantageously used in a variety of forming shapes with some types of hose and fittings and to perform various other forming, stamping or marking operations.

In Figures 15, 16 and 17 I have illustrated a modification of my improved apparatus in which a combined pressing or crimping and swaging operation is performed upon the fitting to secure it to the hose end. In Figure 15 the apparatus is substantially identical with that of Figure 1 except for the operating cam and plungers and the contour of the faces of the pressing fingers and the parts which are substantially identical with the parts shown in Figure 1 have been similarly numbered and will be referred to by the same reference characters. The pressing fingers 10 are provided with working faces 52 which are adapted to engage the sleeve 53 of the coupling. The inner end of the coupling abuts against a stop 32 having a locating or centering pin 35, as in Figure 1, and the outer plunger member 54 engages the hub portion 24 of the finger carrying spider. An inner plunger 55 is slidably carried within a suitable bore in the outer plunger 54. This inner plunger 55 extends through the bore in the hub 24 of the spider and carries at its end the adjustable stop member 32. A pin 56 is mounted in the inner plunger 55 and projects into a slotted aperture 57 in the outer plunger 54 and a spring 58, disposed in the slot 57, tends to hold the pin 56 in the left hand end of the slot 57 with the stop member 32 in its withdrawn position relative to the outer plunger 54. A guide pin 59, mounted in the outer plunger 54, extends into a slot or keyway 60 and prevents rotation of the plunger 54 while permitting longitudinal movement thereof relative to the frame 1. The double cam which operates the mechanism of Figure 15 is made up of two separated identical cam portions 61 and 62 which operate the outer plunger 54 and another cam face 63, having a different contour from the cams 61 and 62, which is disposed between cams 61 and 62 and operates the inner plunger 55 and controls the swaging action of the fingers.

Referring particularly to Figures 15 and 17, the cam shaft 64 may be considered to be rotating in the direction of the arrow and the face of the cams 61 and 62 engage the end of the tubular outer plunger 54 while the surface of the cam 63 engages the rounded end 55' of the inner plunger 55. When the parts are in the position illustrated in Figures 15 and 17 the cams have moved the plungers 54 and 55 simultaneously to the right from their farthest withdrawn (or left) position which occurs when the cams 61, 62 and 63 engage the plungers 54 and 55 at 65 (Fig. 17), into a position where the outer plunger 54 has reached its farthest advanced position and the fingers 10 have completed their pressing action on the sleeve 53 of the coupling. It will be seen that as the portion of the cam surfaces 61 and 62 from the point 66 to approximately point 67 are circular, no further advance of the plunger 54 will take place and consequently the fingers 10 will not be caused to reduce the diameter of the sleeve 53 further. However, as the cams continue to rotate in the direction of the arrow from the positions shown in Figures 15 and 17, the cam 63 will continue to move the inner plunger 55 to the right against the action of the spring 58. This movement of the inner plunger 55 will not be accompanied by corresponding movement of the outer plunger 54 because of the resistance offered thereto by the engagement of the fingers 10 with the collet member 11. Movement of the inner plunger 55 will, however, push the coupling outwardly, or to the right in Figure 15, and will cause a swaging action to take place between the surfaces 52 of the fingers 10 and the sleeve 53. When this separate movement of the plunger 55 and the coupling relative to the fingers 10 has reached its maximum the fingers and their working faces 52 will be in the positions shown in Figure 16. Rotation of the cams 61, 62 and 63, which are all keyed to the shaft 64, continues until the flat portion seen in Figure 17 again engages the ends of the plungers and the plungers are permitted simultaneously to return to their withdrawn positions where they are ready for another operation.

By providing the above described double cam and double plunger apparatus a combined pressing and swaging operation can be carried out upon a coupling or other article. The inward pressing action of the fingers followed by longitudinal movement of the fingers relative to the article while maintaining the fingers in their inner positions, results, in the case of a hose coupling, in a very effective attachment of the coupling to the hose. The end of the flexible hose is pressed very firmly into engagement with the end of the coupling by the swaging or ironing action which takes place intermediate the ends of the coupling sleeve during the longitudinal movement of the coupling relative to the fingers.

From the above description of my improved method of attaching fittings to hose and several forms of apparatus for carrying out the method, it will be seen that the resulting hose and coupling units will have properties not found in articles made by previously employed processes. In my improved hose and coupling assembly the metal of the sleeve or flange of the coupling which engages the hose has substantially the same physical properties as the parent metal from which the couplings are made. In articles of this class extruded brass rod is commonly used and the parts are formed on automatic machines. The metallurgical structure of extruded rod is particularly suited for the service in which these parts operate and by providing a coupling assembly in which all parts of the coupling retain substantially the original physical characteristics of the extruded rod the strength of the part is greatly increased over the previously used couplings in which the metal of the coupling was subjected to violent kneading and cold working during the rolling or swaging operation performed thereon to attach it to the hose. Moreover, in previous procedures, it has been necessary to anneal the fittings before attaching to the hose and, as such annealing necessarily involved the entire fitting, the physical characteristics of the body of the fitting were detrimentally changed. Annealing also required an acid cleaning step which was expensive and in some instances, as noted before, actually harmful to threaded parts.

It will be further understood that my method can be used with entire success on plated articles without in any way injuring the adhesion of the plating to the parent metal. As a relatively low unit pressure is applied to the fitting sleeve during the crimping operation cracking and other failure of the sleeve during attachment to the hose is largely eliminated.

Although I have described my improved method of attaching couplings to hose ends in considerable detail, it will be understood by those skilled in the art that variations and modifications may be made without departing from the spirit of my invention. For example, the apparatus illustrated has been described as particularly adapted for securing couplings or the like to hose ends but it will be seen that my improved method is adaptable to other operations on articles other than hose fittings. I do not, therefore, wish to be limited to the specific forms and procedures illustrated and described herein, but claim as my invention all embodiments thereof coming within the scope of the appended claim.

I claim:

The method of securing a non-metallic hose to a metallic fitting having a sleeve portion, which includes the steps of inserting the hose into said sleeve, and applying a substantially uniform pressure substantially radially inwardly simultaneously around substantially the entire circumference of a portion of said sleeve located between the ends thereof and thereby reducing the diameter of said portion of said sleeve simultaneously on all parts of the circumference thereof in a single, uninterrupted movement to its final diameter, and thereafter, while maintaining said uniform circumferential pressure, longitudinally moving said sleeve with respect thereto to subject said sleeve to a drawing action and thereby lengthening said reduced portion whereby said sleeve is formed into gripping engagement with said hose without reducing the diameter of the end portions of the sleeve.

FRED HUNZIKER.